US006258868B1

(12) United States Patent
Heymann

(10) Patent No.: US 6,258,868 B1
(45) Date of Patent: Jul. 10, 2001

(54) FOAM MATERIAL

(75) Inventor: Peter Heymann, Düsseldorf (DE)

(73) Assignee: Gerro Plast GmbH, Düsseldorf (DE)

( * ) Notice: Subject to any disclaimer, the term of this patent is extended or adjusted under 35 U.S.C. 154(b) by 0 days.

(21) Appl. No.: 09/268,863

(22) Filed: Mar. 15, 1999

(51) Int. Cl.$^7$ ............... C08F 136/06; C08J 9/00
(52) U.S. Cl. .............. 521/148; 521/146; 521/81; 521/139; 428/365; 428/71; 428/314.8
(58) Field of Search .............. 521/81, 139, 146, 521/148; 428/36.5, 71, 314.8

(56) References Cited

U.S. PATENT DOCUMENTS

| | | | |
|---|---|---|---|
| 5,340,844 | * | 8/1994 | Welsh et al. ............ 521/82 |
| 5,342,560 | * | 8/1994 | Sturm et al. .......... 264/45.9 |
| 5,939,464 | * | 8/1999 | Wang ..................... 521/139 |

FOREIGN PATENT DOCUMENTS

| | | |
|---|---|---|
| 4011003 | 10/1991 | (DE) . |
| 3055437 | 7/1982 | (EP) . |
| 9533006 | 12/1995 | (WO) . |

* cited by examiner

Primary Examiner—Nathan M. Nutter
Assistant Examiner—Olga Asinovsky
(74) Attorney, Agent, or Firm—Martin A. Farber

(57) ABSTRACT

Polystyrene-based foam material for the production of for example label material, wherein the foaming has been made with a blowing agent and preferably a nucleating agent, wherein the blowing agent is for example a decomposable blowing agent (chemical blowing agent) or consists of for example carbon dioxide, nitrogen gas or even water, and with a thermoplastic elastomeric blend composition consisting of at least one styrenic block copolymer and one homogeneously branched ethylene-interpolymer.

22 Claims, No Drawings

FOAM MATERIAL

FIELD AND BACKGROUND OF THE INVENTION

The invention is concerned with a polystyrene-based foam and a method to produce such foam for the production f.e. of label material.

Such foams are known in various embodiments. Reference is made for example to DE-A1 40 11 003. This state of the art refers to a foam, which has recently been developed in order to avoid CFCs by using blowing agents in form of hydrocarbons, carbondioxides, nitrogenes, combinations thereof etc. Before, is has also been known to produce foams using chemical blowing agents together with nucleating agents, see for example EP-A3-055 437.

A technical problem with such polystyrene-based foams is especially their brittleness, resulting in easy tearing and inferior elasticity. In order to improve these properties, it has already been proposed to put the polystyrene-based foam as one layer in a multi-layer foam, with one of the layers being a polyolefinic layer. However, this is affected with comparatively high production costs and extrusion problems. As it is often desired, for recycling purposes, to have only one kind of material, such multi-layer foam consisting of different plastic materials, may create also problems.

SUMMARY OF THE INVENTION

An object of the present invention is to propose a polystyrene-based foam, which has improved properties in view of the brittleness without a reduction in the properties being relevant for making them usable for especially label material.

This problem has been solved with a foam of the present application. Such foams are produced with a blowing agent and preferably also a nucleating agent, whereby the blowing agent can be one of the blowing agents known in the state of the art. These are for example chemical or decomposable blowing agents, carbondioxide, nitrogen gas or even water. As nucleating agents, the common nucleating agents can be used. These are f.e. talc and/or sodium hydrogene carbonate and/or ammoniumhydrocarbonate and/or calcium carbonate and/or clay and/or citric acid etc. The nucleating agents can be used in amounts of about 0.05 to about 5% per weight of the foam, preferably in a range from about 0.3 to about 2.0% by weight. The amount can be even as low as 0.01%. Further it is of importance, that the foaming will be made, with a polystyrene material combined with a thermoplastic elastomeric blend composition, consisting at least of one styrenic block copolymer and one homogeneously branched ethylene interpolymer.

Surprisingly, it has been found, that such a foam has a remarkably reduced brittleness and improved elasticity but is nevertheless producable with the common production methods such as by extrusion, for example in flat-die extrusion, annular die extrusion, horizontal blown film extruders or the like. No multi-layer foam with an polyolefinic layer is necessary to meet high requirements.

However, it is possible to make in a per se known manner a coextrusion of a non-foamed layer with a foamed layer, both layers based on polystyrene. Nevertheless, it is also possible, according to the invention, to make multi-layer-foam as in the state of the art, but with remarkably thinner polystyrene based layers. Accordingly, there can be also layers of different raw material. Individual layers can be foamed or non-foamed.

It is especially preferred to add the mentioned thermoplastic elastomeric blend composition in such an amount, that in case of a shrinkable polystyrene based foam a possibility to shrink into recesses, such as to follow concave structures, is reached.

It has further been found, that the amount of the mentioned thermoplastic elastomeric blend composition, starting from a certain threshold-amount, leads to a foam having advantages in terms of separability. This especially for PET-applications. It is possible to separate such foam from PET for example by water. The foam does swim on top, whereas the PET sinks to the bottom. It is believed, that this is due to a high amount of closed cells in the polystyrene foam, whereas the cells in the foam of the state of the art are ruptured in a high amount. Therefore, the foam of the state of the art will get filled with water and such foam also goes to the bottom in case of the mentioned separation procedure.

In a further development of such foam, an important feature is to add such an amount of nucleating agent, that the foam has a density of lower than 0.8 $g/cm^3$. It is preferred to have an amount of such nucleating agent of from about 1 g to 50 g/per kg foam. It is preferred that the foam has a density of 0.06 to 0.75 $g/cm^3$.

Especially, for a polystyrene-based foam to be used for the production of printable labels, it is preferred to produce the foam with a thickness of below 0.2 mm. It is possible to produce the foam with a thickness of 0.06–0.195 mm. In case, the foam shall be used to make trays or cups, thicknesses such as 0.4 and 0.5 mm are preferred.

Such foam does also have a very good printability, due to a high surface quality. Surprisingly, also the gloss is remarkably improved. The foam described here has a gloss which is superior to the gloss of all polystyrene-foams foamed according to any known method in the state of the art.

The mentioned elastomeric blend compositions are especially such compositions as are disclosed in the PCT-application WO95/33006. This application is incorporated herein by reference, especially in order to include one of the features mentioned in that reference into a claim of the present application.

The mentioned elastomeric blend compositions do to a certain extend replace the polystyrene resin used to produce the polystyrene-based foam. Such replacement can be in an amount of 1–60%. It is preferred, to replace the polystyrene resin in an amount of 15–40%, even more preferably in an amount of 15–30%. The elastomeric blend composition is mixed with the remaining amount of polystyrene resin and thereafter the resin is used in the production as a usual polystyrene resin.

EXAMPLES

The following examples may further illustrate the invention:

1. It has been produced a polystyrene based foam using a usual amount of nucleating agent as mentioned, but with 5% by weight of the mentioned thermoplastic elastomeric blend composition (TEBC).

The resulting foam showed an Elmendorf Tear in cross direction higher than in the state of the art foam.

Further, such foam showed a gloss value (according to the 20° Gloss test) about 15% higher compared to a usual value. The 2% Secant Modulus in machine direction, measured in MPa, was compared to a usual value of about 850 remarkably reduced for about 15%. The 2% Secant Modulus in cross direction, measured again in Mpa, was compared to a usual value of 270 reduced for about 20%.

The Tensile Yield in machine direction, measured again in MPa, was compared to usual value of 22.5 reduced for about 13%. The Ultimate Tensile value in machine direction, measured in MPa, was, compared to a usual value of about 21 reduced for about 15%.

The Tensile Yield in cross direction, measured in Mpa was, compared to 6 with a usual foam for about 10% reduced.

The Ultimate Tensile in cross direction, measured in Mpa, was, compared to a value for a normal foam of 6.1 reduced for about 12%.

The Ultimate Elongation in cross direction, expressed in %, was similarly low as for normal foam, but nevertheless significantly lower.

2. It has been made a foam according to example 1, however, with an amount of 10% "TEBC". The characteristic values were compared to the values of state of the art polystyrene foam as follows:

| | |
|---|---|
| Elmendorf Tear CD, g | +70% |
| 20° Gloss | +35% |
| 2% Secant Modulus MD, MPa | −20% |
| 2% Secant Modulus CD, Mpa | −30% |
| Tensile Yield MD, Mpa | −15% |
| Ultimate Tensile MD, Mpa | −15% |
| Tensile Yield CD, Mpa | −15% |
| Ultimate Tensile CD, Mpa | −15% |
| Ultimate Elongation CD, % | same |

3. A polystyrene based foam has been made as before, however, with an amount of 20% of "TEBC". The following values were obtained:

| | |
|---|---|
| Elmendorf Tear CD, g | +60% |
| 20° Gloss | +90% |
| 2% Secant Modulus MD, Mpa | −22% |
| 2% Secant Modulus CD, Mpa | −40% |
| Tensile Yield MD, MPa | −5% |
| Ultitnate Tensile MD, Mpa | same |
| Tensile Yield CD, Mpa | −12% |
| Ultimate Tensile CD, Mpa | −12% |
| Ultimate Elongation CD, % | −30% |

4. A polystyrene based foam has been produced according to the examples mentioned before, however, with an amount of "TEBC" of 30%. The following values were obtained:

| | |
|---|---|
| Elmendorf Tear CD, g | +125% |
| 20° Gloss | +130% |
| 2% Secant Modulus MD, MPa | −22% |
| 2% Secant Modulus CD, MPa | −22% |
| Tensile Yield MD, MPa | −10% |
| Ultimate Tensile MD, MPa | −5% |
| Tensile Yield CD, MPa | +15% |
| Ultimate Tensile CD, MPa | +15% |
| Ultimate Elongation CD, % | −30% |

Remarkable is, that the 2% Secant Modulus in cross direction, significant for the brittleness, goes through a minimum, at foams having around 20% of the mentioned thermoplastic elastomeric blend composition, and is then rising again for higher amount of TEBC.

What is claimed is:

1. Polystyrene-based foam material, wherein foaming is effected with a blowing agent, wherein the blowing agent is a decomposable blowing agent, carbon dioxide, nitrogen gas or water, with a thermoplastic elastomeric blend composition consisting of at least one styrenic block copolymer and one homogeneously branched ethylene-interpolymer.

2. Foam according to claim 1, having a density of lower than 0.8 g/cm$^3$.

3. Foam according to claim 2, having a density of 0.06–0.75 g/cm$^3$.

4. Foam according to claim 1 having a thickness of lower than 0.7 mm.

5. Foam according to claim 1 having a thickness of lower than 0.2 mm.

6. Foam according to claim 5, having a thickness of 0.06–0.195 mm.

7. A foam material comprising a thermoplastic elastomeric blend composition consisting of at least one styrenic block copolymer and one homogeneously branched ethylene-interpolymer, said elastomeric blend composition foamed with a blowing agent.

8. The foam material of claim 7, further comprising a nucleating agent.

9. The foam material of claim 8, wherein said nucleating agent is selected from talc, sodium carbonate, ammonium carbonate, calcium carbonate, clay or citric acid.

10. The foam material of claim 8, wherein said blowing agent is a decomposable blowing agent.

11. The foam material of claim 8, wherein said blowing agent is selected from carbon dioxide, nitrogen gas or water.

12. The foam material of claim 8, wherein said nucleating agent is present at a concentration of from about 0.01 weight percent to about 2.0 weight percent.

13. The foam material of claim 12, wherein said styrenic block copolymer and said homogeneously branched ethylene-interpolymer are present in said elastomeric blend composition in a ratio of from about 40:60 to about 99:1, respectively.

14. The foam material of claim 13, wherein said styrenic block copolymer and said homogeneously branched ethylene-interpolymer are present in said elastomeric blend composition in a ratio of from about 60:40 to about 85:15, respectively.

15. The foam material of claim 14, wherein said styrenic block copolymer and said homogeneously branched ethylene-interpolymer are present in said elastomeric blend composition in a ratio of from about 70:30 to about 85:15, respectively.

16. The foam material of claim 13, having a density less than 0.8 g/cm$^3$.

17. The foam material of claim 16, having a density from about 0.6 to about 0.75 g/cm$^3$.

18. The foam material of claim 16, having a thickness less than 0.4 mm.

19. The foam material of claim 18, having a thickness less than 0.2 mm.

20. The foam material of claim 19, having a thickness of from about 0.06 to about 0.195 mm.

21. Foam according to claim 1 having a thickness of lower than 0.5 mm.

22. Foam according to claim 1 having a thickness of lower than 0.4 mm.

* * * * *